United States Patent Office 3,684,514
Patented Aug. 15, 1972

3,684,514
LIGHT-SENSITIVE SILVER HALIDE COLOR PHOTOGRAPHIC EMULSIONS
Masakuni Iwama, Isaburo Inoue, Mitsuto Fujiwara, Teruo Hanzawa, Tamotsu Kojima, Toshihiko Yamamoto, and Takaya Endo, Tokyo, Japan, assignors to Konishiroku Photo Industry Co., Ltd., Tokyo, Japan
No Drawing. Filed Feb. 3, 1970, Ser. No. 8,444
Claims priority, application Japan, Feb. 6, 1969, 44/8,433
Int. Cl. G03c 1/40
U.S. Cl. 96—100
6 Claims

ABSTRACT OF THE DISCLOSURE

A new compound of the general formula

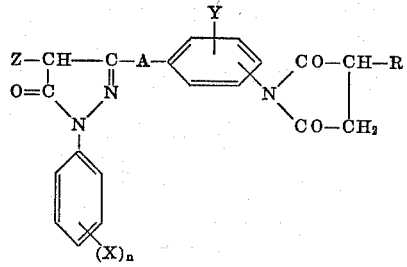

wherein:

R is an alkyl group having 8–18 carbon atoms or an alkenyl group,
A is —NHCO— or —NH—,
X is halogen atom or a methyl, alkoxy, aryloxy or alkoxycarbonyl group.
n is an integer of 1 to 3,
Y is a hydrogen or halogen atom, and
Z is a hydrogen atom or an arylazo group is found to be useful as a magenta-forming color coupler for light-sensitive silver halide emulsions in color photography. The coupler shows good solubility in high boiling solvents and forms a dye image having suitable absorption for color photography.

---

This invention relates to light-sensitive silver halide color photographic emulsions containing novel couplers for forming magenta dye images.

More particularly, the invention pertains to light-sensitive silver halide color photographic emulsions containing, as the so-called protect type couplers, magenta couplers represented by the general formula

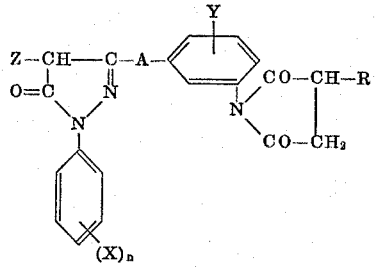

wherein:

R is an alkyl group having 8–18 carbon atoms or an alkenyl group,

A is —NHCO— or —NH—,
X is a halogen atom or a methyl, alkoxy, aryloxy or alkoxycarbonyl group,
n is an integer of 1 to 3,
Y is a hydrogen or halogen atom, and
Z is a hydrogen atom or an arylazo group.

Heretofore, various compounds have been known as protect type magenta couplers. However, all of these compounds have one or more drawbacks in that they do not show sufficient solubility for coupler solvents and tend to crystallize in emulsions or films; or they are difficultly synthesized and are prepared by use of expensive starting materials to bring about industrial and economic disadvantages; or the dye images obtained by use of photographic emulsions containing said compounds are unstable to light, heat and humidity and are not desirable in spectral absorption properties.

However, the above-mentioned magenta couplers employed in the present invention are extremely useful as protect type couplers, since they have such characteristics as mentioned below.

(1) They are easily soluble in such high boiling solvents as dibutyl phthalate, tricresyl phosphate, etc., so that the amounts of high boiling solvents for couplers can be decreased to make it possible to obtain high concentration and stable dispersions.

(2) They do not crystallize in emulsions or in coated and dried films.

(3) Dye images obtained by use of photographic emulsions containing the couplers employed in the present invention have excellent spectral absorption properties and are fast to light, heat and humidity.

Moreover, the couplers employed in the present invention can be easily prepared by a mere ring-closure reaction, with splitting off of water, of alkali-soluble succinic acid monoamide type couplers having diffusion-preventing groups which have been produced on a commercial scale, and it is considered that the aforesaid excellent characteristics are ascribable to long chain alkylsuccinimide groups.

The couplers employed in the present invention can be synthesized in the following manner:

A 1 - (substituted phenyl)-3-benzamido or aminoanilino)-5-pyrazolone is condensed with a long chain alkylsuccinic anhydride to prepare a succinic acid moonamide compound (hereinafter referred to as the ring-unclosed coupler). The ring-unclosed coupler is heated together with a sulfuric acid-acetic acid mixture and is then ring-closed by dehydration. The resulting product is purified according to an appropriate method, whereby a high purity coupler is obtained.

The long chain alkylsuccinic anhydride, which is the main starting material, is described on p. 366 of "Dai-Yukikagaku (Grand Organic Chemistry)," vol. 4 (published by Asakura Shoten, Tokyo), and is a compound produced on commercial scale using a malonic acid ester and a long chain alkyl halide.

Concretely, the couplers employed in the present invention can be synthesized in such a manner as set forth in the synthesis examples shown below.

Synthesis Example 1

A mixture comprising 39.8 g. of 1 - (2,4,6 - trichlorophenyl) - 3 - (3 - aminobenzamido) - 5 - pyrazolone and 400 ml. of glacial acetic acid is stirred and charged with 35.2 g. of octadecylsuccinic anhydride. The mixture is heated at 80° C. for 1 hour, and then 40 ml. of concentrated sulfuric acid is added thereto. After being allowed to stand at said temperature for 10 minutes, the mixture is charged into 2 l. of water to deposit a white precipitate, which is then recovered by filtration, washed with water, dried and recrystallized from 200 ml. of ethyl acetate to obtain 50 g. of a white powder, yield 68.5%. This powder is 1 - (2,4,6 - trichlorophenyl) - 3 - (3-octadecylsuccinimido benzamido) - 5 - pyrazolone represented by the following structural formula:

(1)
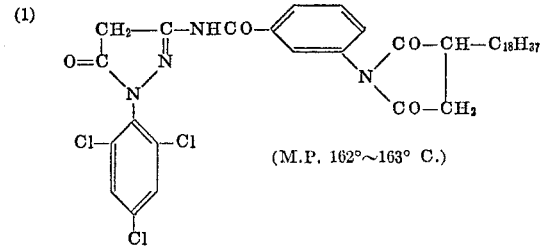
(M.P. 162°~163° C.)

According to the same synthetic process as above, such couplers as shown below can be synthesized.

(2) 1-(2,4,6-trichlorophenyl)-3-(4-octadecylsuccinimido-anilino)-5-pyrazolone

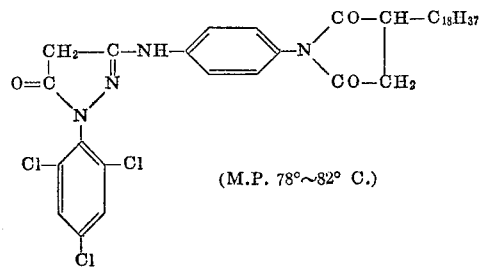
(M.P. 78°~82° C.)

(3) 1-(2,4,6-trichlorophenyl)-3-(2-chloro-4-octadecyl-succinimido-anilino)-5-pyrazolone

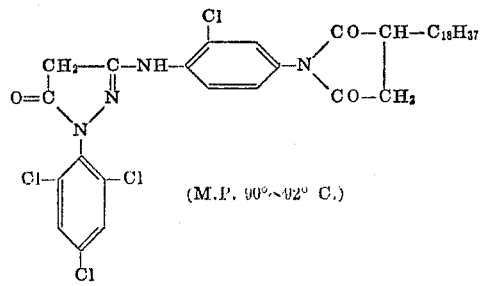
(M.P. 90°~92° C.)

(4) 1-(2-chlorophenyl)-3-(4-octadecylsuccinimido-anilino)-5-pyrazolone

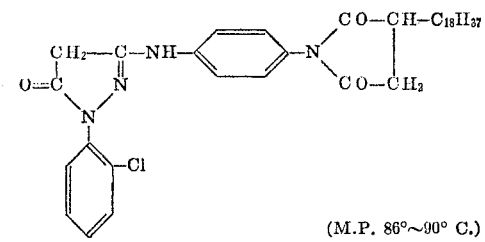
(M.P. 86°~90° C.)

(5) 1-(2,4,6-trichlorophenyl)-3-(3-octadecenyl-succinimido-benzamido)-5-pyrazolone

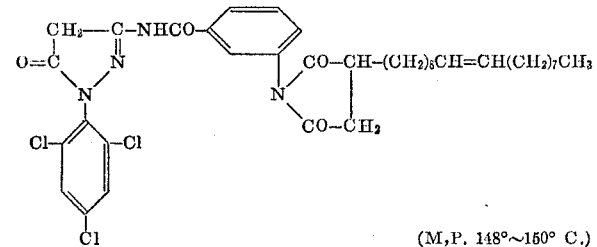
(M.P. 148°~150° C.)

(6) 1-(2,4,6-trichlorophenyl)-3-(3-octadecenyl-succinimido-benzamido)-5-pyrazolone

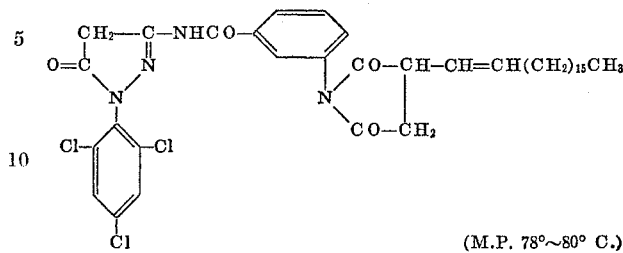
(M.P. 78°~80° C.)

(7) 1-(2,4,6-trichlorophenyl)-3-(3-dodecylsuccin-imidobenzamido)-5-pyrazolone

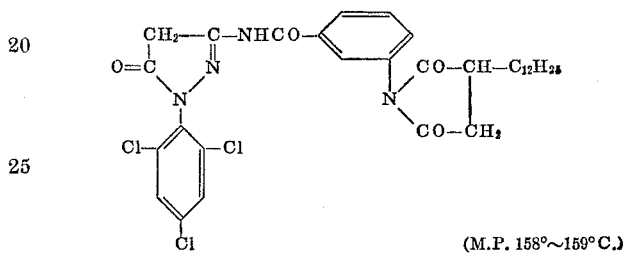
(M.P. 158°~159° C.)

(8) 1-(2,4,6-trichlorophenyl)-3-(3-octylsuccin-imidobenzamido)-5-pyrazolone

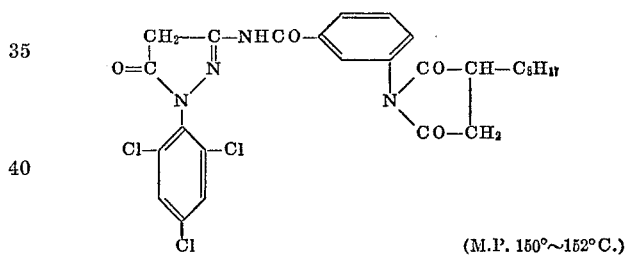
(M.P. 150°~152° C.)

(9) 1-(2,4-dimethyl-6-chlorophenyl)-3-(3-octadecyl succinimido-benzamido)-5-pyrazolone

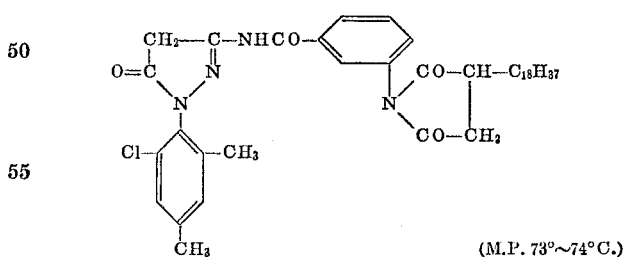
(M.P. 73°~74° C.)

(10) 1-(2,4-dimethyl-6-chlorophenyl)-3-(2-chloro-5 - octadecylsuccinimido-benzamido)-5-pyrazolone

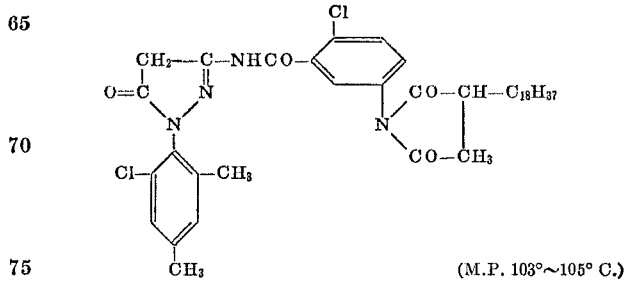
(M.P. 103°~105° C.)

(11) 1-(2-chlorophenyl)-3-(3-octadecylsuccin-imidobenzamido)-5-pyrazolone

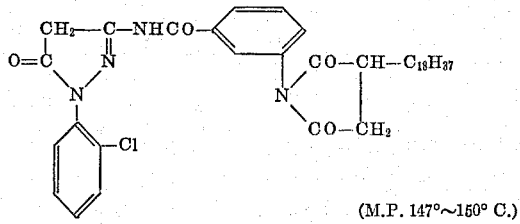

(M.P. 147°~150° C.)

(12) 1-(4-methoxyphenyl)-3-(3-dodecylsuccin-imido-benzamido)-5-pyrazolone

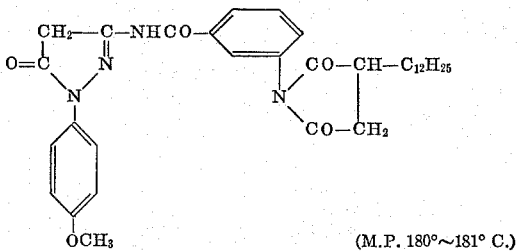

(M.P. 180°~181° C.)

(13) 1-[4-(4-t-butylphenoxy) phenyl]-3-(3-dodecyl-succinimido-benzamido)-5-pyrazolone

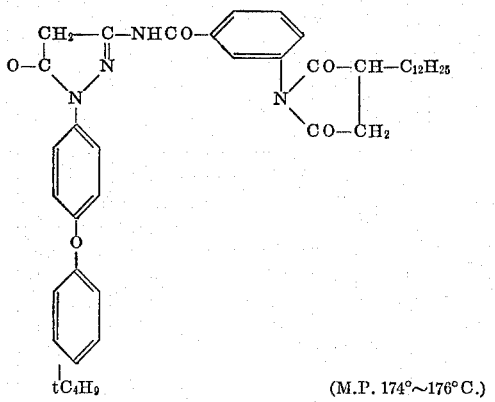

(M.P. 174°~176° C.)

(14) 1-(4-ethoxycarbonylphenyl)-3-(4-octadecyl-succinimido-benzamido)-5-pyrazolone

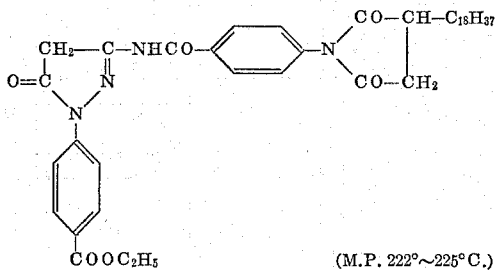

(M.P. 222°~225° C.)

Synthesis Example 2

3.6 g. of p-anisidine is diazotized with a mixture comprising 40 ml. of water, 10 ml. of concentrated hydrochloric acid and 2.4 g. of sodium nitrite, and 80 ml. of alcohol is added to the resulting diazonium salt.

A solution of 14.6 g. of the above-exemplified coupler (4) in 146 ml. of pyridine is added at 5°–10° C. to the above-mentioned solution of the diazonium salt. After stirring for 3 hours, the mixed solution is diluted with 350 ml. of water and then charged with 150 ml. of concentrated hydrochloric acid to deposit a precipitate, which is then recovered by filtration, water-washed, dried and recrystallized from alcohol to obtain 13 g. of an orange powder, M.P. 187°–189° C., yield 75.6%. This powder is the coupler shown below.

(15) 1 - (2,4,6 - trichlorophenyl)-3-(3-octadecyl-succinimido-benzamido)-4-(4-methoxy-phenylazo)-5-pyrazolone

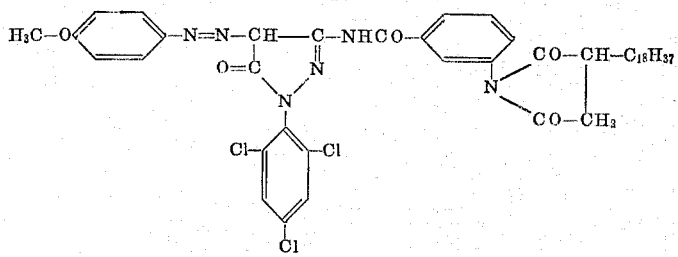

The above-exemplified couplers are examples of the couplers employed in the present invention, and it is needless to say that couplers usable in the invention are not limited only to these.

For the production of light-sensitive silver halide color photographic emulsions by use of the couplers of the aforesaid general formula, any of the conventional methods may be adopted. For example, one or two or more of the couplers are dissolved in a high boiling solvent having a boiling point of more than 175° C., such as tricresyl phosphate or dibutyl phthalate, or in a low boiling solvent such as butyl acetate or butyl propionate, or, if necessary, in a mixture of said two solvents, and the solution is mixed with an aqueous gelatine solution containing a surface active agent. Subsequently, the mixed solution is emulsified by means of a high speed rotary mixer or a colloid mill. The resulting emulsion is added directly to a silver halide photographic emulsion, and is coated onto a suitable support such as a film base or a baryta paper, followed by drying to remove a major proportion of the low boiling solvent. Alternatively, the above-mentioned emulsion is set and then extruded to noddle form, which is subjected to water-washing or the like treatment to remove the low boiling solvent and then added to the photographic emulsion. The resulting total emulsion is coated onto the aforesaid support, followed by drying. In the above manner, a light-sensitive photographic material can be produced.

The coupler employed herein may be incorporated with a ring-unclosed coupler, and the incorporation of 5–30% of a ring-unclosed coupler improves the dispersibility of the coupler and has the effect of preventing the coupler from deposition.

In the above case, the amount of the coupler to be added to the silver halide photographic emulsion is preferably in the range of 10–100 g. per mole of the silver halide, but not always limited to said range.

In the photographic emulsion employed in the above case, there may be used any of such silver salts as silver chloride, silver bromide, silver iodide, silver chlorobromide, silver chloroiodide and silver chlorobromoiodide. This emulsion may contain a chemical sensitizer, e.g. sulfur sensitizer, a natural sensitizer present in gelatine, a reducing sensitizer and a noble metal salt. Further, the emulsion may contain common photographic additives such as, for example, fog inhibitor, stabilizer, anti-stain agent, anti-irradiation agent, polymeric modifier, coating aid, etc., and may contain a carbocyanine dye, a merocyanine dye or the like which is known as an optical sensitizer for photographic emulsions.

The light-sensitive material obtained in the above manner is exposed to light and treated with a developing solution containing a p-phenylenediamine type developer, and is then bleached and fixed to give a high density dye image having excellent spectral absorption properties and transparency.

Typical examples of the developer employed for the development of the light-sensitive color photographic materials in accordance with the present invention are sulfates, sulfites and hydrochlorides of N,N-diethyl-p-phenylenediamine, N-ethyl-N-β-methanesulfonamidoethyl-3-methyl-4-aminoaniline,
N-ethyl-N-hydroxyethyl-p-phenylenediamine,
N-ethyl-N-hydroxyethyl-2-methyl-p-phenylenediamine, and
N,N-diethyl-2-methyl-p-phenylenediamine.

The present invention is illustrated in further detail below with reference to examples, but it is needless to say that the examples are illustrative and the invention is by no means limited thereto.

EXAMPLE 1

20 g. of the exemplified coupler (5) was completely dissolved at 80° C. in a mixture of 20 ml. of dibutyl phthalate and 60 ml. of butyl acetate. This solution was mixed with 10 ml. of a 10% aqueous solution of Alkanol B (alkylnaphthalenesulfonate produced by Du Pont Co.) and 200 ml. of a 5% aqueous gelatine solution, and the mixed solution was subjected to a colloid mill to form a coupler dispersion. This coupler dispersion was added to 1,000 ml. of a high speed gelatine silver iodobromide emulsion, which was then coated onto a film base, followed by drying, to obtain a stable light-sensitive photographic film. The thus obtained light-sensitive photographic film was exposed according to an ordinary procedure and was then developed at 20° C. for 10 minutes by means of a developing solution of the following composition:

|   | G. |
|---|---|
| N,N-diethyl-p-phenylenediamine hydrochloride | 2.5 |
| Anhydrous sodium sulfite | 2.0 |
| Sodium carbonate (monohydrate) | 82.0 |
| Potassium bromide | 2.0 |
| Water to make 1,000 ml. | |

The thus developed film was subjected to ordinary stopping and fixing treatments, was washed with water for 10–15 minutes and was then treated for 5 minutes with a bleaching solution of the following composition:

|   | G. |
|---|---|
| Potassium ferricyanide | 100 |
| Potassium bromide | 50 |
| Water to make 1,000 ml. | |

The film was further washed with water for 5 minutes and was then fixed for 5 minutes with a fixing solution comprising:

|   | G. |
|---|---|
| Sodium thiosulfate (pentahydrate) | 250 |
| Water to make 1,000 ml. | |

Thereafter, the material was washed with water for 20–25 minutes and was then dried to obtain a brilliant magenta dye image, absorption maximum 532 mμ.

EXAMPLE 2

10 g. of the exemplified coupler (6) was completely dissolved at 60° C. in a mixture of 10 ml. of tricresyl phosphate and 30 ml. of butyl acetate. This solution was mixed with 5 ml. of a 10% aqueous Alkanol B solution and 200 ml. of a 5% aqueous gelatine solution, and the mixed solution was subjected to a colloid mill to form a dispersion. This dispersion was added to 500 ml. of a gelatine silver iodobromide emulsion, which was then coated onto a film base and was dried to obtain a light-sensitive photographic material. The thus obtained material was exposed and was then developed at 20° C. for 10 minutes with a developing solution of the following composition:

|   | G. |
|---|---|
| Metol | 3.0 |
| Anhydrous sodium sulfite | 60.0 |
| Hydroquinone | 6.0 |
| Anhydrous sodium carbonate | 50.0 |
| Potassium bromide | 1.0 |
| Water to make 1,000 ml. | |

The thus developed material was subjected to ordinary stopping and film-hardening treatments and to water-washing, was then subjected to secondary exposure by means of white light, and was developed at 20° C. for 12 minutes with a developing solution of the following composition:

|   | G. |
|---|---|
| N,N-diethyl-p-phenylenediamine | 5.0 |
| Anhydrous sodium sulfite | 2.0 |
| Sodium carbonate (monohydrate) | 82.0 |
| Potassium bromide | 1.0 |
| Water to make 1,000 ml. | |

Subsequently, the material was subjected to ordinary stopping, fixing, water-washing and bleaching treatments, was washed for 20 minutes, and was then dried to obtain a high clarity positive magenta dye image having an absorption maximum at 530 mμ.

EXAMPLE 3

10 g. of the exemplified coupler (9) was completely dissolved at 50° C. in 20 ml. of dibutyl phthalate. This solution was mixed with 5 ml. of a 10% aqueous Alkanol B solution and 200 ml. of a 5% aqueous gelatine solution, and the mixed solution was subjected several times to a colloid mill to form a dispersion. This dispersion was added to 500 ml. of a gelatine silver chlorobromide emulsion, which was then coated onto a baryta paper and was then dried to prepare a light-sensitive material. The thus prepared light-sensitive material was exposed to light and developed at 20° C. for 10 minutes in a bath of the following composition:

|   | G. |
|---|---|
| N-ethyl - N - hydroxyethyl-p-phenylenediamine sulfate | 2.5 |
| Anhydrous sodium sulfite | 2.0 |
| Hydroxylamine hydrochloride | 1.0 |
| Sodium carbonate (monohydrate) | 82.0 |
| Potassium bromide | 2.0 |
| Water to make 1,000 ml. | |

The thus developed material was dipped in a stopping bath comprising 10 ml. of glacial acetic acid, 3 g. of caustic soda and 1,000 ml. of water and, immediately thereafter, was immersed for 4 minutes in an acidic hardening fixing bath. After washing with water for 10 minutes, the material was bleached at 20° C. for 8 minutes in a bath of the following composition:

|   | G. |
|---|---|
| EDTA.2Na (disodium salt of ethylenediamine tetraacetic acid) | 40.0 |
| Ferric chloride | 30.0 |
| Sodium carbonate (monohydrate) | 20.0 |
| Potassium bromide | 30.0 |
| Sodium thiosulfate (pentahydrate) | 200.0 |
| Water to make 1,000 ml. | |

The thus treated material was washed with water for 20 minutes, was immersed for 2 minutes in a stabilizing bath, and was then dried to obtain a magenta dye image having an absorption maximum at 535 mμ which was excellent in light fastness.

EXAMPLE 4

6.0 g. of the exemplified coupler (5) and 2.0 g. of the exemplified coupler (15) were completely dissolved at 80° C. in a mixture of 8.0 ml. of dibutyl phthalate and 24 ml. of butyl acetate. This solution was mixed with 4 ml. of a 10% aqueous Alkanol B solution and 80 ml. of a 5% aqueous gelatine solution, and the mixed solution was formed into a dispersion. This coupler dispersion was added to 400 g. of a high speed silver iodobromide emulsion, which was then coated onto a film base and was then dried to prepare a light-sensitive photographic material.

The thus prepared light-sensitive photographic material was exposed according to an ordinary procedure and was then treated in the same manner as in Example 1 to obtain a yellow positive image having an absorption maximum at 435 mμ and a magenta dye image having an absorption maximum at 540 mμ.

What is claimed is:

1. A light-sensitive silver halide color photographic emulsion, having dispersed therein a solution of a magenta coupler in a high-boiling solvent, said coupler represented by the general formula

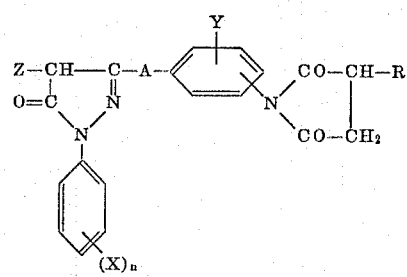

wherein:
R is an alkyl group having 8–18 carbon ataoms or an alkenyl group having 8–18 carbon atoms,
A is —NHCO— or —NH—,
X is a halogen atom or a methyl, alkoxy, aryloxy or alkoxycarbonyl group,
$n$ is an integer of 1 to 3,
Y is a hydrogen or halogen atom, and
Z is a hydrogen atom or an arylazo group, and the group

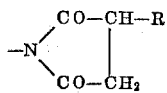

is attached to the para- or meta-position of the benzene ring with respect to the group A.

2. A light-sensitive silver halide color photographic emulsion according to claim 1 wherein said magenta coupler is represented by the general formula

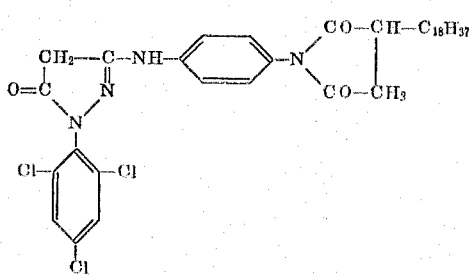

3. A light-sensitive silver halide color photographic emulsion according to claim 1 wherein said magenta coupler is represented by the general formula

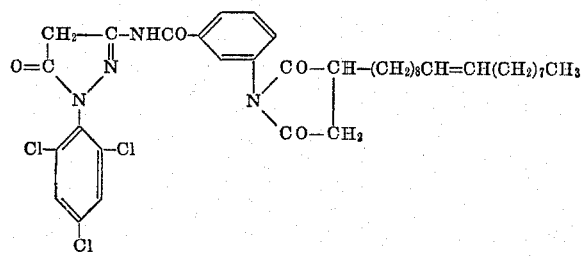

4. A light-sensitive silver halide color photographic emulsion according to claim 1 wherein said magenta coupler is represented by the general formula

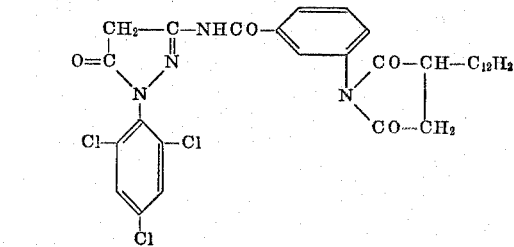

5. A light-sensitive silver halide color photographic emulsion according to claim 1 wherein said magenta coupler is represented by the general formula

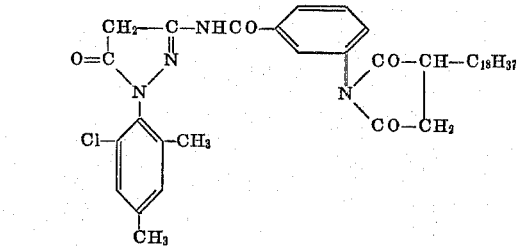

6. A light-sensitive silver halide color photographic emulsion according to claim 1 wherein said magenta coupler is represented by the general formula

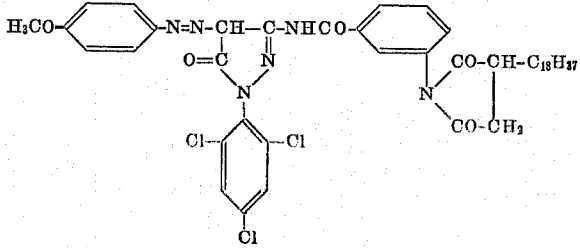

References Cited
UNITED STATES PATENTS

| | | | |
|---|---|---|---|
| 3,328,419 | 6/1967 | Anderson | 96—100 |
| 3,383,214 | 5/1968 | Anderson | 96—100 |

FOREIGN PATENTS

| | | | |
|---|---|---|---|
| 1,074,053 | 6/1967 | Great Britain | 96—100 |
| 1,083,049 | 9/1967 | Great Britain | 96—100 |

J. TRAVIS BROWN, Primary Examiner

U.S. Cl. X.R.
96—56.5; 260—310